US006429285B2

(12) United States Patent
Horowitz et al.

(10) Patent No.: US 6,429,285 B2
(45) Date of Patent: *Aug. 6, 2002

(54) POLYMER COMPOSITIONS PROVIDING LOW RESIDUE LEVELS AND METHODS OF USE THEREOF

(75) Inventors: Daniel M. Horowitz; Elaine M. Brennan, both of Somerville, MA (US)

(73) Assignee: Metabolix, Inc., Cambridge, MA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/227,978

(22) Filed: Jan. 8, 1999

Related U.S. Application Data
(60) Provisional application No. 60/070,837, filed on Jan. 9, 1998.

(51) Int. Cl.$^7$ .............................. C08F 6/16; C08L 31/02
(52) U.S. Cl. ................. 528/482; 528/488; 528/499; 528/501; 524/832; 524/845; 523/340; 523/342
(58) Field of Search ...................... 524/832, 845; 528/488, 499, 501, 502, 482; 523/342

(56) References Cited

U.S. PATENT DOCUMENTS

| | | | |
|---|---|---|---|
| 3,067,055 A | | 12/1962 | Saulnier, Jr. |
| 3,582,289 A | | 6/1971 | Elmes |
| 3,582,390 A | | 6/1971 | Saulnier |
| 4,123,563 A | | 10/1978 | Mitobe et al. |
| 4,284,662 A | | 8/1981 | Matsuzaki et al. |
| 4,327,123 A | | 4/1982 | Levine et al. |
| 4,339,475 A | | 7/1982 | Hinosugi et al. |
| 4,590,092 A | | 5/1986 | Giancaterini et al. |
| 4,623,820 A | * | 11/1986 | Deal et al. |
| 4,826,493 A | | 5/1989 | Martini et al. |
| 4,876,331 A | | 10/1989 | Doi |
| 4,880,592 A | | 11/1989 | Martini et al. |
| 4,910,145 A | | 3/1990 | Holmes et al. |
| 4,954,366 A | | 9/1990 | Pezzulo et al. |
| 4,990,366 A | | 2/1991 | Pezzulo et al. |
| 5,086,143 A | * | 2/1992 | Sutton et al. ............... 524/825 |
| 5,145,511 A | | 9/1992 | Patel et al. |
| 5,178,906 A | | 1/1993 | Patel et al. |
| 5,245,023 A | | 9/1993 | Peoples et al. |
| 5,250,430 A | | 10/1993 | Peoples et al. |
| 5,286,842 A | | 2/1994 | Kimura |
| 5,292,860 A | | 3/1994 | Shiotani et al. |
| 5,461,139 A | | 10/1995 | Gonda et al. |
| 5,480,794 A | | 1/1996 | Peoples et al. |
| 5,512,669 A | | 4/1996 | Peoples et al. |
| 5,516,883 A | | 5/1996 | Hori et al. |
| 5,563,239 A | | 10/1996 | Hubbs et al. |
| 5,874,124 A | * | 2/1999 | Adebayo et al. |

FOREIGN PATENT DOCUMENTS

| | | |
|---|---|---|
| CA | 2006508 | 8/1990 |
| EP | 0 735 008 A2 | 10/1996 |
| EP | 0 802 558 A2 | 10/1997 |
| WO | WO 95/15260 A1 | 6/1995 |
| WO | WO 95/20614 A1 | 8/1995 |
| WO | WO 95/20615 A1 | 8/1995 |
| WO | WO 96/17369 A1 | 6/1996 |

OTHER PUBLICATIONS

Abe et al., "Biosyntyhesis from gluconate of a random copolyester consisting of 3–hydroxybutyrate and medium–chain–length 3–hydroxyalkanoates by *Pseudomonas sp.* 61–3," *Int. J. Biol. Macromol.* 16:115–19 (1994).

Agostini, et al., "Synthesis and Characterization of Poly–γ–Hydrozybutyrate. I. Synthesis of Crystalline DL Poly–γ–Hydroxybutyrate from DL–ϵ–Butrolactone," *Polym. Aci.* 9:2775–87 (1971).

Amos & McInerney, "Composition of poly–γ–hydroxyalkanoate from *Syntrophomonas wolfei* grown on unsaturated fatty acid substrates," *Arch. Microbiol.* 155:103–06 (1991).

Brandl, et al., "Ability of the phototrophic bacterium *Rhodospirillum rubrum* to produce various poly (beta–hydroxyalkanoates): potential for biodegradable polyesters," *Int. j. Biol. Macromol.* 11:49–55 (1989).

Byrom, "Miscellaneous Biomaterials" in *biomaterials* (D. Byrom. ed.) pp. 333–359 (MacMillan Publishers, London 1991).

De Koning, et al., "A process for the recovery of poly(hydroxyalkanoates) from Pseudomonads Part 1: Solubilization," *Bioprocess Eng.* 17:7–13 (1997).

De Koning, et al., "A process for the recovery of poly(hydroxyalkanoates) from Pseudomonads Part 2: Process development and economic evaluation," *Bioprocess Eng.* 17:15–21 (1997).

De Smet, et al., "Characterization of intracellular inclusions formed by *Pseudomonas oleovorans* during growth on octane," *J. Bacteriol.* 154:870–78 (1983).

DuBois, et al., "Macromolecular Engineering of Polyactones and Polylactides. 12. Study of the Depolmerization Reactions of Poly (ϵ–caprolactone) with Functional Aluminum Alkoxide End Groups," *Macromolecules* 26:4407–12 (1993).

German & Bose, *Injection Molding of Metal and Ceramics*, Metal Powder Industries Federation:Princeton, New Jersey, 1997.

(List continued on next page.)

Primary Examiner—Tae H. Yoon
(74) *Attorney, Agent, or Firm*—Holland & Knight LLP

(57) ABSTRACT

Polymer emulsion compositions presenting low levels of residue after thermolytic decomposition are provided. The compositions, based on polyhydroxyalkanoates or acrylics, are useful in a variety of applications, including the metallization of cathode ray tube phosphor screens, where use of the compositions provides enhanced luminosity and ease of manufacture. Other applications include use of the emulsion in additives used in powder molding techniques and in the manufacture of ceramic tiles.

11 Claims, No Drawings

OTHER PUBLICATIONS

German, *powder Injection Molding,* Metal Powder Industries Federation:Princeton, New Jersey, 1990.

Gross, et al., "γ–Monosubstituted–β–propiolactones Using Trialkyaluminum–Water Catalytic Systems and Polymer Characterization," *Macromolecules* 21:2657–68 (1988).

Hocking & Marchessault, "Syndiotactic poly[(R,S)–γ–hydroxybutyrate] isolated from methyaluminum–catalyzed polymerization," *Poly. Bull.* 30:163–170 (1993).

Hocking & Marchessault, "Biopolyesters" in *chemistry adn Technology of Biodegradable Polymers,* (Griffin, ed), pp. 48–96, Chapman and Hall:London, 1994.

Holmes, "Biologically Produced (R)–3–hydroxyalkanoate Polymers and Copolymers," in *Development in Crystalline Polymers* (D.C. Bassett, Ed.), pp. 1–65, Elsevier:London, 1988.

Hori, et al., "Ring–Opening Polymerization of optically Active γ–Butyrolactone Using Distannoxane Catalysts: Synthesis of High Molecular Weight Poly(3–hydroxybutyrate)," *Macromolecules* 26:5533–34 (1993).

Horsch, "Inheritance of Functional Foreign Genes in Plants," *Science* 223:496–498 (1984).

Jesudason & Marchessault, "Synthetic Poly[(R,S)–γ–hydroxyalkonoates]with Butyl and Hexyl Side Chains," *Macromolecules* 27:2595–602 (1994).

Kato, et al., "Production of a novel copolyester of 3–hydroxybutic acid with a medium–chain–length 3–hydroxyalkanoic acids by *Pseudomonas sp.* 61–3 from sugars," *App. Microbiol. Biotechnol.* 45:363–70 (1996).

Kemnitzer, et al., "Preparation of predominatly Syndiotactic Poly(γ–hydroxybutyrate) by thge Tributylin Methoxide Catalyzed Ring–Opening Polymerization of racemic γ–Butyrolactone," *Macromolecules* 26:1221–29 (1993).

Kharas, et al., "Polymers of Lactic Acid" in *Plast. Microbes* (Mobley, Ed,), pp. 93–137m Hanser:Munich, Germany, 1994.

Lafferty, et al., "Microbial Production of Poly–b–hydroxybutric acid" in *Biotechnology* (Rehm & Reed, Eds.), pp. 135–176, Verlagsgesellschaft:Weinheim, 1988.

Le Borgne & Spassky, "Stereoelective polymerization of γ–butyrolactone," *Polymer* 30:3212–19 (1989).

Lee, et al., "Biosynthesis of copolyesters consisting of 3–hydroxybutyric acid and medium chain length 3–ydroxyalkanoic acids from 1,3–butanediol or from 3–hydroxybutyrate by *Pseudomonas sp.* A33," *Appl. Microbiol. Biotechnol.* 42:901–09 (1995).

Steinbuchel & Valentin, "Diversity of bacterial polyhydroxyalkanoic acids," *FEMS Microbiol Lett.* 128:218–28 (1995).

Steinbuchel & Wiese, "A Pseudomonas strain accumulating polyesters of 3–hydroxybutyric acid and medium–chain–length 3–hydroxyalkanoic acids," *Appl. Microbiol. Biotechnol.* 37:691–97 (1992).

Steinbuchel, "Polyhydroxyalkanoic Acids" in *Biomaterials* (Byrom Ed), pp. 123–213, MacMillan Publishers:London, 1991.

Tanahashi & Doi, "Thermal Properties and Stereoregularity of Poly(3–hydroxybutyrate) Prepared from Optically Active γ–Butyrolactone with a Zinc–Based Catalyst," *Macromolecuiles* 24:5732–33 (1991).

Valentin, et al., "Identification of 4–hydroxyvaleric acid as a constituent of biosynthetic polyhydroxyalkanoic acids from bacteria," *Appl. Microbiol. Biotechnol.* 36:507–14 (1992).

Valentin, et al., "Identification of 4–hydroxyhexanoic acid as a new constituuent of biosynthetic polyhydroxyalkanoic acids from bacteria," *Appl. Microbiol. Biotechnol.* 40:710–16 (1994).

Valentin, et al., "Identification of 5–hydroxyhexanoic acid, 4–hydroxyaheptanoic acid and 4–hydroxyoctanoic acid as new consitiuents of bacterial polyhydroxyalkanoate acids," *Appl. Microbiol. Biotechnol.* 46:261–67 (1996).

Wallen & Rohwedder, "Poly–γ–hydroxyalkanoate from Activated Sludge," *Environ. Sci. Technol.* 8:576–79 (1974).

William & Peoples, "Biodegradable plastics from plants," *CHEMTECH* 26:38–44 (1996).

Xie, et al., "Ring–operating Polymerization of γ–butyrolactone by Thermophilic Lipases," *Macromolecules* 30:6997–98 (1997).

* cited by examiner

POLYMER COMPOSITIONS PROVIDING LOW RESIDUE LEVELS AND METHODS OF USE THEREOF

CROSS-REFERENCE TO RELATED APPLICATIONS

Priority is claimed to U.S. Provisional application Serial No. 60/070,837, filed Jan. 9, 1998.

BACKGROUND OF THE INVENTION

The present invention is generally in the field of polymer emulsion compositions which are useful as processing aids in the manufacture of various products, and more particularly to compositions which are incorporated into a product during processing and subsequently removed by thermolytic means.

It is a common practice in the manufacture of cathode ray tubes (CRTs) to apply a reflective metal coating on the inside of the phosphor screen, where the metal coating reflects light from the phosphors through the front of the CRT, thereby improving screen brightness and avoiding undesirable light scattering by the CRT funnel assembly. The metal coating ordinarily is a thin layer of aluminum applied by vapor deposition.

In order to form a reasonably flat and reflective metal coating, it is necessary to form a smooth surface over the phosphor particles before application of the metal coating. Frequently, a smooth surface is achieved by applying a temporary polymer layer that is removed after application of the metal layer. Complete removal of the polymer layer, or substrate, is essential for a bright, stable, and high quality screen image.

In one method, a smooth surface can be formed by wetting the inner surface of the phosphor screen, applying an organic solution of a volatilizable polymer, and then evaporating the organic solvent to form a thin polymer film. After the film is dried, a metal, such as aluminum, is deposited onto the surface of the polymer film, and then the entire assembly is baked to volatilize the polymer. While the method gives satisfactory results, the required use of large volumes of organic solvents is undesirable, due to the risk of fire and worker or environmental exposure.

Consequently, the prevalent method in industry for forming the polymer substrate is to coat the dry phosphor screen with a water-based, i.e. aqueous, polymer emulsion at a temperature near or above its minimum filming temperature. Evaporation of the water yields a smooth polymer substrate, which is largely, but incompletely, volatilized by thermal treatment following metallization of the screen. U.S. Pat. No. 3,067,055 to Saulnier Jr., for example, discloses a general method for metallization of phosphor screens using aqueous polymer emulsions. U.S. Pat. No. 3,582,289 to Elmes; U.S. Pat. No. 3,582,390 to Saulnier; U.S. Pat. No. 4,123,563 to Mitobe et al.; U.S. Pat. No. 4,590,092 to Giancaterini et al.; U.S. Pat. No. 4,954,366 to Pezzulo et al.; and U.S. Pat. No. 5,178,906 to Patel et al. disclose additives which are used in concert with the aqueous emulsions to reduce blistering and/or to improve adhesion or other properties of the metallic layer.

The emulsions used for phosphor screen metallization typically are based on acrylic resins, since these polymers depolymerize or otherwise form volatile substances at temperatures below 450° C., the maximum temperature tolerated by the glass panel. Acrylic emulsion compositions, or lacquers, are available with a variety of film-forming temperatures, hardnesses, and particle size distributions, spanning the range of properties that are known to be useful in the metallization of CRT phosphor screens. A commonly used commercial acrylic emulsion is Rhoplex™ B-74 (Rohm and Haas Co., Philadelphia, Pa.), also known as Primal B-74. The use of combinations of acrylic emulsions to enhance the quality of the metallic layer is described in U.S. Pat. No. 4,284,662 to Matsuzaki et al. and U.S. Pat. No. 4,990,366 to Pezzulo et al.

While the use of known aqueous-based polymer emulsions does avoid the problems associated with use of organic solvent-based emulsions, the aqueous-based polymer emulsions available in the art present other disadvantages. It is generally observed that the emulsion-derived substrates do not completely bake out at temperatures up to 450° C., rather they leave a residue or ash, which requires repeated or prolonged bake-out cycles and/or oxygen supplementation in the baking atmosphere. These extra steps are undesirably costly, time-consuming, and raise additional safety issues. Furthermore, a certain quantity of residue may still remain on the phosphor glass, reducing screen brightness.

Various efforts to overcome these deficiencies are described in the art. For example, U.S. Pat. No. 5,145,511 to Patel et al. discloses a method for a combined panel bake/frit sealing cycle, which reduces the carbonaceous residue left behind on the phosphor screen by the emulsion. However, the proposed combined cycle is slower than the conventional cycle, and reduces only the carbonaceous residue, not the other residues that contribute to diminished CRT quality.

U.S. Pat. No. 4,339,475 to Hinosugi et al. describes a method in which the acrylic emulsion is deposited on the phosphor screen while the screen is still wet, in order to minimize the quantity of emulsion required and thereby reduce the quantity of residue after baking-out. However, this method is difficult to use since the miscibility of the acrylic emulsion with the underlying water layer facilitates the diffusion of polymer particles into the water layer. This process results in a polymer substrate of inadequate thickness and uniformity, thereby yielding a metallic layer with diminished reflectance.

U.S. Pat. No. 4,327,123 to Levine et al. describes the use of specific acrylic copolymer emulsions for phosphor screen metallization. However, the emulsions that worked suitably contained anionic surfactants, such as sodium dodecylsulfate, as well as residues from the potassium persulfate initiator. Levine disclosed that syntheses utilizing purely nonionic surfactants or no surfactants did not yield useful emulsions. The emulsions also contained inorganic initiators and/or their decomposition products. Accordingly, the emulsions do not significantly improve over other conventional materials, such as Rhoplex™ B-74, available from Rohm & Haas.

PCT application WO 96/17369 by Adebayo et al. discloses the use of an emulsion of a poly(hydroxyalkanoate) copolymer, poly-3-hydroxybutyrate-co-3-hydroxyvalerate (PHBV or Biopol™), for metallization of a phosphor screen. However, due to its bacterial origin, PHBV emulsion contains biological residues that are nonvolatilizable and cause charring or discoloration after bake-out when this emulsion is used for CRT metallization. Accordingly, the existing emulsion techniques are unsuitable for use in producing CRTs for applications demanding superior brightness, such as high-definition television (HDTV).

It is therefore an object of this invention to provide aqueous polymer compositions for use in manufacturing processes with reduced levels of residue following their thermolytic removal.

It is another object of this invention to provide aqueous polymer emulsion compositions and methods of preparing and using these emulsions, which can be used to produce CRTs having enhanced luminosity.

SUMMARY OF THE INVENTION

Polymer emulsion compositions containing low levels of residue after thermolytic decomposition are provided. The emulsions are aqueous emulsions including polyhydroxyalkanoate and/or acrylic polymers, and can be prepared from commercially available emulsions which are treated to remove non-volatilizable components. The removal process preferably includes filtration and/or centrifugation techniques, and optionally can be conducted in the presence of additives known to be volatilizable under manufacturing conditions, such as in the making of cathode ray tubes (CRTs). Methods for preparing these emulsion compositions are described.

The polymer emulsions are useful in a variety of applications, especially in the metallization of phosphor screens of CRTs, where use of the emulsion yields enhanced CRT luminosity and provides improved ease of manufacture. In a preferred embodiment, the method for metallizing a phosphor screen includes the steps of (a) coating the phosphor screen with the polymer emulsion composition described herein; (b) drying the composition to form a polymer substrate; (c) applying a reflective metallic layer to the substrate to form a metallized phosphor screen; and (d) baking the metallized phosphor screen to volatilize the substrate, leaving the reflective metallic layer intact on the phosphor screen.

Other applications include use of the emulsion in additives used in powder molding techniques and in the manufacture of ceramic tiles.

DETAILED DESCRIPTION OF THE INVENTION

In a typical process for making acrylic emulsions, a surfactant-stabilized emulsion of one or more monomers in water is prepared, one or more radical initiators are added, and the polymerization reaction is allowed to proceed, optionally with addition of extra monomer. Polymerization generally is viewed as occurring within surfactant micelles, to which additional monomers are transferred by diffusion from the monomer droplets. The initiators are generally combinations of sulfur-containing species, such as inorganic salts of persulfate and metabisulfite. The polymer particle size in the resulting emulsion is governed by a variety of factors. A critical factor is the nature and concentration of the surfactants present. To maintain the small particle size and uniform size distribution required for use as a lacquer for CRT phosphor screens, anionic surfactants are required during acrylic polymerization, with the optional addition of nonionic surfactants. Examples of such anionic surfactants include sodium dodecylsulfate, sodium alkylbenzenesulfonate, and sodium dioctylsulfosuccinate. It has been discovered, however, that anionic surfactants, as well as inorganic, sulfur-containing residues from the radical initiators, have poor bake-out characteristics under thermolytic manufacturing processes, such as the metallization of CRT phosphor screens. Accordingly, emulsion compositions were prepared from which these non-volatilizable substance are largely removed and which leave essentially no residue during thermolytic removal, for example, in the metallization of CRT screens and as a binder in the fabrication of molded products such as ceramic tiles.

As used herein, the term "non-volatilizable" refers to a substance which, upon heating in air to a temperature of 450° C. for an interval of not longer than 45 minutes, leaves a solid residue of greater than 2% by weight. Determination of volatilizability may be conducted either using the substance in the neat state or using a solution or suspension of the substance in solvent.

I. Polymer Emulsion Compositions

The principal component of the present compositions is an aqueous emulsion of a polymer, preferably an acrylic, polyhydroxyalkanoate, or mixture thereof. The composition should be substantially free of non-volatilizable substances, but can include volatilizable additives.

1. Acrylics

Known acrylic emulsion compositions can be used if treated as described herein to remove non-volatilizable substances. Acrylic emulsions are manufactured by methods well known in the art of polymer synthesis (Gilbert, R. G. *Emulsion Polymerization: A Mechanistic Approach;* Academic Press: London, 1995). Acrylics useful in the compositions described herein include ones having units of formula:

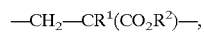

wherein $R^1$ and $R^2$ are any radical of formula $C_nH_{2n+1}$ and wherein n is an integer from 0 to 10.

A preferred acrylic is RHOPLEX™ B-74. Other useful acrylic polymers are disclosed, for example, in U.S. Pat. No. 3,067,055 to Saulnier.

2. Polyhydroxyalkanoates

In another embodiment, the composition includes an emulsion or latex of a biological poly(hydroxyalkanoate) (PHA). Since emulsions prepared using known treatments of medium-chain length PHAs (de Koning, G. J. M.; Witholt, B. *Bioprocess Eng.* 1997, 17, 7–13; de Koning, G. J. M.; Kellerhals, M.; van Meurs, C.; Witholt, B. *BioprocessEng* 1997, 17, 15–21), contain non-volatilizable substances for use as thermolyzable lacquers or binders, these emulsions must be processed, as described herein, to remove non-volatilizable substances.

Several types of PHAs are known. It is useful to broadly divide the PHAs into two groups according to the length of their side chains and according to their pathways for biosynthesis. Those with short side chains, such as polyhydroxybutyrate (PHB), a homopolymer of R-3-hydroxybutyric acid units, are crystalline thermoplastics; PHAs with long side chains are more elastomeric. The former polymers have been known for about seventy years (Lemoigne & Roukhelman 1925), while the latter polymers are a relatively recent discovery (deSmet, et al., *J Bacteriol,* 154:870–78 (1983)). Before this designation, however, PHAs of microbial origin containing both R-3-hydroxybutyric acid units and longer side chain units from C5 to C16 were identified (Wallen & Rowheder, *Environ. Sci. Technol.,* 8:576–79 (1974)). A number of bacteria which produce copolymers of D-3-hydroxybutyric acid and one or more long side chain hydroxyacid units containing from five to sixteen carbon atoms have been identified more recently (Steinbuchel & Wiese, *Appl Microbiol. Biotechnol.,* 37:691–97 (1992); Valentin et al., *Appl. Microbiol Biotechnol.,* 36: 507–14 (1992); Valentin et al., *Appl. Microbiol. Biotechnol.,* 40:710–16 (1994); Abe et al.,

*Int. J Biol. Macromol.,* 16:115–19 (1994); Lee et al., *Appl Microbiol Biotechnol.,* 42:901–09 (1995); Kato et al., *Appl. Microbiol. Biotechnol.,* 45:363–70 (1996); Valentin et al., *Appl. Microbiol. Biotechnol,* 46:261–67 (1996); U.S. Pat. No. 4,876,331 to Doi). Useful examples of specific two-component copolymers include PHB-co-3-hydroxyhexanoate (Brandl et al., *Int. J. Biol. Macromol.,* 11:49–55 (1989); Amos & McInerey, *Arch. Microbiol.,* 155:103–06 (1991); U.S. Pat. No. 5,292,860 to Shiotani et al.). Chemical synthetic methods have also been applied to prepare racemic PHB copolymers of this type for applications testing (WO 95/20614, WO 95/20615, and WO 96/20621).

A. Polymer Formulas

Suitable molecular weights of the polymers are between about 10,000 and 4 million Daltons. Preferable molecular weights are between about 50,000 and 1.5 million Daltons. The PHAs preferably contain one or more units of the following formula:

wherein n is 0 or an integer; and wherein $R_1$, $R^2$, $R^3$, and $R^4$ are independently selected from saturated and unsaturated hydrocarbon radicals, halo- and hydroxy- substituted radicals, hydroxy radicals, halogen radicals, nitrogen-substituted radicals, oxygen-substituted radicals, and hydrogen atoms.

Suitable monomeric units include hydroxybutyrate, hydroxyvalerate, hydroxyhexanoate, hydroxyheptanoate, hydroxyoctanoate, hydroxynonanoate, hydroxydecanoate, hydroxyundecanoate, and hydroxydodecanoate units. PHAs including monomers and polymers and derivatives of 3-hydroxyacids, 4-hydroxyacids and 5-hydroxyacids can be used. Representative PHAs are described in Steinbuchel & Valentin, *FEMS Microbiol Left,* 128:219–28 (1995).

B. Preparation of Polyhydroxyalkanoates

The PHAs can be prepared from a biological source such as a microorganism which naturally produces the PHAs or which can be induced to produce the PHAs by manipulation of culture conditions and feedstocks, or microorganisms or a higher organism such as a plant, which has been genetically engineered so that it produces PHAs.

Methods which can be used for producing PHA polymers from microorganisms which naturally produce polyhydroxyalkanoates are described in U.S. Pat. No. 4,910,145 to Holmes, et al.; Byrom, "Miscellaneous Biomaterials" in *Biomaterials* (Byrom, ed.) pp. 333–59 (MacMillan Publishers, London 1991); Hocking and Marchessault, "Biopolyesters" in *Chemistry and Technology of Biodegradable Polymers* (Griffin, ed.) pp. 48–96 (Chapman & Hall, London 1994); Holmes, "Biologically Produced (R)-3-hydroxyalkanoate Polymers and Copolymers" in *Developments in Crystalline Polymers* (Bassett, ed.) vol. 2, pp. 1–65 (Elsevier, London 1988); Lafferty et al., "Microbial Production of Poly-b-hydroxybutyric acid" in *Biotechnology* (Rehm & Reed, eds.) vol. 66, pp. 135–76 (Verlagsgesellschaft, Weinheim 1988); Muller & Seebach, *Angew. Chem. Int. Ed. Engl.* 32:477–502 (1993).

Methods for producing PHAs in natural or genetically engineered organisms are described by Steinbuchel, "Polyhydroxyalkanoic Acids" in *Biomaterials* (Byrom, ed.) pp. 123–213 (MacMillan Publishers, London 1991); Williams & Peoples, *CHEMTECH,* 26:38–44 (1996); Steinbüchel & Wiese, *Appl. Microbiol. Biotechnol.,* 37:691–97 (1992); U.S. Patent Nos. 5,245,023; 5,250,430; 5,480,794; 5,512,669; 5,534,432 to Peoples and Sinskey; Agostini et al., *Polym. Sci.,* Part A-1, 9:2775–87 (1971); Gross et al., *Macromolecules,* 21:2657–68 (1988); Dubois, et al., *Macromolecules,* 26:4407–12 (1993); Le Borgne & Spassky, *Polymer,* 30:2312–19 (1989); Tanahashi & Doi, *Macromolecules,* 24:5732–33 (1991); Hori et al., *Macromolecules,* 26:4388–90 (1993); Kemnitzer et al., *Macromolecules,* 26:1221–29 (1993); Hori et al., *Macromolecules,* 26:5533–34 (1993); Hocking & Marchessault, Polym. Bull., 30:163–70 (1993); Xie et al., Macromolecules, 30:6997–98 (1997); and U.S. Pat. No. 5,563,239 to Hubbs et al. Other polymer synthesis approaches including direct condensation and ring-opening polymerization of the corresponding lactones are described in Jesudason & Marchessault, *Macromolecules* 27:2595–602 (1994); U.S. Pat. No. 5,286,842 to Kimura; U.S. Pat. No. 5,563,239 to Hubbs et al.; U.S. Pat. No. 5,516,883 to Hori et al.; U.S. Pat. No. 5,461,139 to Gonda et al.; and Canadian Patent Application No. 2,006,508. WO 95/15260 describes the manufacture of PHBV films, and U.S. Patent Nos. 4,826,493 and 4,880,592 to Martini et al. describe the manufacture of PKB and PHBV films. U.S. Pat. No. 5,292,860 to Shiotani et al. describes the manufacture of the PRA copolymer poly(3-hydroxybutyrate-co-3-hydroxyhexanoate.

3. Surfactants and Other Additives

Polymer emulsions typically are supplemented with functional additives, such as surfactants, pH control agents, solvents, inorganic salts, chelators, dispersants, emulsifiers, film-forming agents, coalescing agents, wetting or leveling aids, antifoaming agents, defoaming agents, biocides, stabilizers, preservatives, viscosity modifiers, Theological control agents, and plasticizers. The additives may be incorporated before, during, or after polymerization, and can contribute additional residue following thermolytic removal of the polymer. In the emulsion compositions disclosed herein, it is desirable to remove or avoid using non-volatilizable additives. Determination of volatilizability may be conducted either using the substance in the neat state or using a solution or suspension of the substance in solvent.

II. Methods of Preparing the Emulsion Compositions

Preparation of the emulsion compositions includes separation of the non-volatilizable constituents. The separation can be conducted using one or more of several techniques, including micro- or ultra-filtration, dialysis, and centrifugation. In all preparative methods, it is desirable to maintain the working temperature below the minimum filming temperature of the emulsion, as this reduces fouling of filters, membranes, and equipment and prevents coalescence of the polymer particles. It may also be useful in the preparation process to add an adequate quantity of a volatilizable surfactant, emulsifier, or dispersant, in order to maintain the quality of the emulsion during processing.

Without being limited by the theory, it is believed that non-volatilizable detergents needed for the preparation of the emulsion from a bacterial cell suspension become adsorbed to the particle surface, from which they may only be displaced by treatment with a relative excess of another surface active agent.

1. Filtration and Diafiltration

In one embodiment, a commercial emulsion, such as Rhoplex™ B-74, is processed by micro- or ultra-filtration, whereby non-volatilizable, water-soluble or water-dispersible substances are washed from the emulsion. The washed emulsion optionally can be supplemented with volatilizable functional additives, before, during, or after the filtration. (To add before washing, the additives should be of a type, like Hypermer™, which are tightly adsorbed to polymer particles and do not readily wash away.)

In another preferred embodiment, the emulsion is processed by diafiltration using a tangential flow apparatus equipped with a ceramic membrane element of carefully chosen pore size. A suitable membrane element should readily pass an aqueous solution comprising non-volatilizable substances, including any micelles or aggregates of the same substance, while retaining most of the polymer particles. A diafiltration process is described in Examples 2–4 below. Washing may be effected with particular efficiency by (a) diluting the starting emulsion to a solids concentration where the performance of the filter element is improved (b) washing the emulsion by diafiltration using one or more volumes of water or an aqueous solution containing volatilizable additives (c) concentrating the washed emulsion to a solids concentration appropriate for transportation.

2. Centrifugation

In another preferred embodiment, the emulsified PHA particles are centrifuged and resuspended one or more times in the presence of an aqueous solution of a volatilizable surfactant, which results in a significant reduction in the residue following thermal treatment of the emulsion. A centrifugation process is described below in Example 5.

Filtration or dialysis can be used in lieu of centrifugation and resuspension. For example, an emulsion including polymer particles and non-volatilizable substances can be placed on one side of a dialysis membrane (e.g., a cellulosic membrane), while the membrane is contacted (e.g. on the other side) with water or an aqueous solution that includes selected volatilizable additives. Polymer particles are retained on the membrane, and the non-volatilizable substances are removed and/or replaced with volatilizable additives.

3. Auxiliary Treatments

In preparing certain of the emulsion compositions disclosed herein, it may be beneficial to perform additional preparation steps to enhance the performance of the compositions. For example, it is known that, when persulfate is used to initiate a polyolefin emulsion polymerization, a sulfur-containing moiety may be covalently incorporated into the polymer at the chain terminus. As this sulfur-containing moiety may also be a source of undesirable residue during phosphor screen bake-out, it may be advantageous to effect its removal during processing. Accordingly, in one embodiment, the emulsion is treated with an alkaline solution prior to or during filtration, centrifugation, or dialysis, to effect the hydrolysis of the sulfate ester linkage and the solubilization of this moiety. The alkaline solution should be selected such that hydrolysis of any oxygen esters present in the polymer is minimized. The removal of a substantial majority of the non-volatilizable impurities can, however, be effected using the methods described herein whether or not the alkali treatment is performed.

A slight degradation of the emulsion quality may occur due to shearing, skinning, coalescence, aggregation, flocculation, or other processing factors, irrespective of the method selected for removal of non-volatilizable components. This degradation generally is manifested by the appearance of a subpopulation of polymer particles having a significantly higher particle size than the bulk of the particles. Such large particles are known to be deleterious to film formation and quality in film-forming polymer emulsions. Accordingly, in one embodiment of the methods and compositions described herein, the larger particles are substantially removed from the processed emulsion by centrifugation or filtration. For film-forming applications, particles with the largest dimension over 10 $\mu$m, and especially those with the largest dimension over 50 $\mu$m, generally are considered undesirable, and should be removed.

III. Methods of Using the Emulsion Compositions

The emulsion compositions described herein are useful in several applications, including the metallization of phosphor screens and in powder molding processes.

1. Metallization of Phosphor Screens

In the preferred embodiment, the method for phosphor screen metallization employs known techniques, such as described in the background section above, using emulsion compositions described herein. The compositions described herein provide improved metallization of CRT phosphor screens following a single bake-out cycle at 450° C. Moreover, the improvement should be evident regardless of the specific method of applying the emulsion or the nature and number of the subsequent heating cycles, since unlike conventional emulsions used as phosphor screen lacquers, the present compositions are rendered essentially free of non-volatilizable substances. Accordingly, use of the compositions should permit one to reduce the temperature, duration, and severity of the bake-out stage, and increase its effectiveness to yield a brighter, more durable CRT.

In a preferred embodiment, the emulsion is formulated to a solids content of 15–30% (wt./wt.), and is applied to the phosphor screen at a temperature near the minimum filming temperature for the emulsion. Following drying and metallization, the emulsion components are thermolytically removed (e.g., burned out), for example, by firing in a furnace or similar device, at a temperature of approximately 450° C. or less. Essentially complete removal of the polymer substrate can be accomplished using this process. Moreover, due to the relative ease of the bake-out process, the removal can be achieved during the thermal sealing of the CRT funnel assembly to the phosphor screen, without a separate pre-bake of the front panel.

2. Powder Processing

In a related application, the emulsion compositions can be utilized as aids in powder processing, such as in the manufacture of ceramic or metallic forms from powders, where the emulsions can be used as binders, lubricants, or agglomerators for the constituent powders. It is generally desirable to remove these additives after forming the appropriate shapes, for example during firing in the sintering of the ceramic or metallic green forms. Certain polymer emulsions known in the art are undesirable for use in these applications, since they release sulfur-containing fumes at the high processing temperatures typical of ceramic sintering, and/or they leave a residue that is detrimental to the look or performance of the finished ceramic or metallic forms. The compositions described herein can be used to reduce or avoid these problems due to the composition's low sulfur content and low ash residue.

In a preferred embodiment, the acrylic compositions disclosed herein are used to replace acrylics used in the manufacture of ceramic tiles, which release sulfur-containing fumes, which are an environmental and health hazard.

In another embodiment, the polyhydroxyalkanoate (PHA) compositions are used to replace or augment the binders used in ceramic or metallic molding compositions. The PHA molding compositions can be used in forming techniques known in the art, such as slip casting, tape casting, extrusion, injection molding, dry pressing and screen printing. These and other powder processing techniques are described in German, "Powder Injection Molding," (Metal Powder Industries Federation, Princeton, N.J. 1990) and German and Bose, "Injection Molding of Metals and Ceramics," (Metal Powder Industries Federation, Princeton, N.J. 1997). Examples of products that can be made using the compositions disclosed herein include ceramic tiles, combustion engine parts, valves, rotors, gear assemblies, printed circuit boards, and superconductors.

The compositions and methods of preparation and use thereof described herein are further described by the following non-limiting examples.

EXAMPLE 1

Determination of Unvolatilized Residue For Emulsions and Additives

Dry samples (0.2–1.0 g) were heated in air to 450° C. at a rate of 10 ° C./min. in quartz or aluminum vessels. The furnace temperature was maintained at 450° C. for a period of 45 min., after which the samples were allowed to cool down and the unvolatilized residue weighed. Liquid samples containing water (solids content 0.2–1.0 g) were heated in air to 150° C. at a rate of 10° C./min., and maintained at 150° C. for 30 min. to evaporate the water. Next, the temperature was increased to 450° C. at a rate of 10° C./min., and maintained at 450° C. for a period of 45 min. The samples then were cooled and weighed. The unvolatilized residue was reported as a percentage of the weight of solids present in the original sample.

Using this procedure, the following additives were determined to yield an unvolatilized residue of less than 0.5% by weight, based on the weight of solids present: Hypermer™ CG-6 (available from ICI Surfactants), alkylphenol ethoxylates (Makon series, available from Stepan Co.), Makon™ NF12 (available from Stepan Co.), alkylamine-N-oxides (Ammonyx LO and SO, available from Stepan Co.), Abex™ 26S (available from Rhone-Poulenc), Triton™ DF-16 (available from Sigma Chemical), Triton™ X-100 (available from Sigma Chemical), polyoxyethylene esters (Myrj™ series, available from ICI Surfactants), polyoxyethylene ethers (Brij™ series, available from ICI Surfactants), Surfynol™ 420 (available from Air Products), Troysan™ 174 (available from Troy Co.), Canguard™ 442 (available from Angus Chemical Co.), and glutaraldehyde (available from Union Carbide).

Using the same procedure, the following substances were determined to yield an unvolatilized residue of greater than 2.0% by weight, based on the weight of solids present: sodium alkylbenzenesulfonate, sodium dodecylsulfate, EDTA, diethylenetriaminepentaacetic acid, protein, nucleic acid, fatty acids, and bacterial cell wall components.

The same procedures for quantifying unvolatilized residues were used in the following examples.

EXAMPLE 2

Preparation of Novel Acrylic Emulsions by Polymeric Membrane Filtration

Rhoplex™ B-74 emulsion (Rohm & Haas, 38% solids wt./wt.) was diluted 1:3 with deionized water to a solids content of approximately 9% (wt./wt.). Hypermer CG-6 was added to the emulsion to an active concentration of 0.5% (wt./vol.), and the pH was adjusted to 7 with ammonium hydroxide. The sample (0.4 L) was processed by diafiltration using a benchtop hollow-fiber cross-flow filtration unit (A/G Technology QuixStand) equipped with a 500 kDa nominal cutoff ultrafiltration membrane (A/G Technology, 0.05 m$^2$ membrane area). The emulsion was maintained at an approximately constant volume by continuous addition of a solution of 0.5% (wt./vol.) Hypermer CG-6 in deionized water. After 10 volumes of diafiltration, the unvolatilized residue from the emulsion was reduced from about 1% (by weight of the solids present) to an undetectable level, which was less than 0.1%. Similar results were obtained using Makon 12 or Myrj 52 surfactants in place of Hypermer CG-6, and using deionized water alone. In the latter case, however, it was necessary to add a volatilizable surfactant at the end of the process in order to obtain an emulsion with satisfactory wetting properties.

EXAMPLE 3

Preparation of a Novel Acrylic Emulsion by Ceramic Membrane Filtration

Rhoplex™ 74 emulsion (Rohm & Haas, 38% solids wt./wt.) was diluted 1:3 with deionized water to a solids content of approximately 9% (wt./wt.). Hypermer CG-6 was added to the emulsion to an active concentration of 0.5% (wt./vol.), and the pH was adjusted to 7 with ammonium hydroxide. The sample was processed by diafiltration using a pilot scale ceramic microfiltration unit (Niro Filtration) equipped with a 0.1 μm nominal cutoff microfiltration element (U.S. Filter Corp. Membralox series, 0.2 m$^2$ membrane area). The emulsion was maintained at an approximately constant volume by continuous addition of a solution of 0.5% (wt./vol.) Hypermer CG-6 in deionized water. After 10 volumes of diafiltration, the unvolatilized residue from the emulsion was reduced from about 1% (by weight of the solids present) to an undetectable level, which was less than 0.1%. Elemental analysis showed that the dried solids from untreated Rhoplex™ B-74 had a sulfur content of 0.46% by weight, and that solids from the final, treated product contained only 0.049% S, which is a reduction of 89% in the sulfur content.

EXAMPLE 4

Preparation of a Novel Acrylic Emulsion by Ceramic Membrane Filtration

Rhoplex™ B-74 emulsion (Rohm & Haas, 38% solids wt/wt) was diluted 1:3 with deionized water to a solids content of approximately 9% (wt./wt.). Water-soluble nonylphenol ethoxylate (Makon 12, Stepan Co.) was added to the emulsion to an active concentration of 0.5% (wt./vol.), and the pH was adjusted to 7 with ammonium hydroxide. The sample was processed by diafiltration using the pilot scale ceramic microfiltration unit described in Example 3 above. The emulsion was maintained at an approximately constant volume by continuous addition of a solution of 0.5% (wt./vol.) Makon 12 in deionized water. After 7 volumes of diafiltration, addition of Makon 12 solution was discontinued and the emulsion was concentrated by filtration to a solids concentration of 29% (wt./wt.). This emulsion had a viscosity of 25 cP. The unvolatilized residue from this emulsion was 0.12% (by weight of the solids presents), while that for untreated Rhoplex™ B-74 was 0.79%, which is a reduction of 85% in the amount of unvolatilized residue.

EXAMPLE 5

Centrifugal Classification of an Acrylic Emulsion

An emulsion was prepared as in Example 4 above with a solids content of 29.12% (wt./wt.). It contained a minor fraction of large particles having an approximate size of 1–100 μm. The bulk of the particles appeared to be in the 70 nm size range. The emulsion was centrifuged in a Sorvall centrifuge for 30 min. at 14,000 g. The centrifuge cake, which was subsequently discarded, contained 0.6% by weight of the total solids originally present, and had a median particle size of 2.5 μm and a particle size range from 0.1 to 183 μm, according to a Coulter LS 130 particle size analyzer. The supernatant, which was retained, was essentially free of particles greater than 1 μm in diameter and had a solids content of 28.95% (wt./wt.).

EXAMPLE 6

Preparation of a PHA Emulsion

A PHA emulsion was made and purified from bacterial cells of *Pseudomonas putida* cultivated on octanoic acid, using known methods. Upon heating, the emulsion provided an unvolatilized residue of 1.71% (by weight of the solids present), which was significantly higher than that of the commercial Rhoplex™ B-74 emulsion. Samples of the emulsion (6.4% solids wt./wt.) were centrifuged for 45 min. at 50,000 g. Each pellet was resuspended to its original volume in a solution of a volatilizable surfactant, recentrifuged as above, and then resuspended in a small volume of deionized water. The percentage of unvolatilized residues for emulsions prepared with several different surfactants is shown in Table 1 below. The emulsion prepared using the Ammonyx LO was used to coat a CRT phosphor screen, which was subsequently metallized and baked-out with satisfactory results.

TABLE 1

Unvolatilized Residues Using PHA with Various Surfactants

| Surfactant | % Unvolatilized Residue* | % Residue Reduction |
| --- | --- | --- |
| none | 0.43 | 75 |
| Triton X-100 | 0.38 | 78 |
| Makon 12 | 0.45 | 74 |
| Brij 35 | 0.41 | 76 |
| Brij 76 | 0.42 | 75 |
| Ammonyx LO | 0.19 | 89 |

*by weight of the solids present

Modifications and variations of the present invention will be obvious to those of skill in the art from the foregoing detailed description. Such modifications and variations are intended to come within the scope of the following claims.

We claim:

1. A method for making a composition comprising a thermolyzable aqueous emulsion of a polymer substantially free of non-volatilizable substances, the method comprising:
    (a) preparing an aqueous emulsion of a polymer selected from the group consisting of
        (i) acrylics having units of formula:

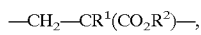

wherein $R^1$ and $R^2$ are any radical of formula $C_nH_{2n+1}$ and wherein n is an integer from 0 to 10,
        (ii) polyhydroxyalkanoates, and mixtures thereof, wherein the emulsion contains non-volatilizable substances; and
    (b) removing substantially all of the non-volatilizable substances from the formed emulsion, thereby reducing levels of residue present following thermolytic removal of the polymer composition.

2. The method of claim 1 wherein the non-volatilizable substances are removed using a filtration process in which polymer particles are maintained in a dispersed state by addition of an aqueous solution to the retentate of the filtration process.

3. The method of claim 2 wherein the filtration process utilizes a filter element formed from a ceramic or polymeric substance, and wherein the performance of the filter is maintained by tangential flow of the retentate.

4. The method of claim 1 wherein the non-volatilizable substances are removed using a centrifugation process.

5. The method of claim 4 wherein polymer solids are collected as the heavier phase in the centrifugation process, and then are resuspended in an aqueous solution containing volatilizable additives.

6. The method of claim 1 wherein the non-volatilizable substances are removed using a liquid-liquid dialysis process.

7. A method for making a composition comprising a thermolyzable aqueous emulsion of a polymer substantially free of non-volatilizable substances, the method comprising:
    (a) preparing an aqueous emulsion of a polymer selected from the group consisting of (i) acrylics having units of formula:

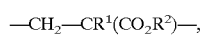

wherein $R^1$ and $R^2$ are any radical of formula $C_nH_{2n+1}$ and wherein n is an integer from 0 to 10,
    (ii) polyhydroxyalkanoates, and mixtures thereof, wherein the emulsion contains non-volatilizable substances;
    (b) removing substantially all of the non-volatilizable substances from the formed emulsion, thereby reducing levels of residue present following thermolytic removal of the polymer composition; and
    (c) removing solid particles formed during step (b) wherein the solid particles are larger than 1 μm in size.

8. The method of claim 1 conducted at a temperature below the minimum filming temperature of the emulsion.

9. The method of claim 2 wherein the filtration is microfiltration.

10. The method of claim 2 wherein the filtration is ultra-filtration.

11. A method for solubilizing sulfur containing moieties present in thermolyzable aqueous polymer emulsions comprising treating the emulsion with an alkaline solution wherein the thermolyzable polymer emulsion is selected from the group consisting of (i) acrylics having units of formula:

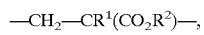

wherein $R^1$ and $R^2$ are any radical of formula $C_n H_{2n+1}$ and wherein n is an integer from 0 to 10,
    (ii) polyhydroxyalkanoates, and mixtures thereof, wherein the emulsion contains non-volatilizable substances, wherein the non-volatilizable substances have been substantially removed from the formed emulsion, thereby reducing levels of residue present following thermolytic removal of the polymer composition.

* * * * *